Dec. 4, 1945.   R. G. PIETY   2,390,270
METHOD OF SURFACE PROSPECTING
Filed Jan. 5, 1942   2 Sheets-Sheet 1

INVENTOR
R. G. PIETY
ATTORNEY

Dec. 4, 1945.  R. G. PIETY  2,390,270
METHOD OF SURFACE PROSPECTING
Filed Jan. 5, 1942  2 Sheets-Sheet 2

INVENTOR
R. G. PIETY
BY
ATTORNEY

Patented Dec. 4, 1945

2,390,270

UNITED STATES PATENT OFFICE 2,390,270

METHOD OF SURFACE PROSPECTING

Raymond G. Piety, Bartlesville, Okla., assignor to Phillips Petroleum Company, a corporation of Delaware Application January 5, 1942, Serial No. 425,701

2 Claims. (Cl. 175—182)

The present invention relates to a method and apparatus for electrical prospecting of the subsurface earth for petroleum or minerals.

Many methods have been proposed in the past for introducing electrical energy into the ground and then measuring the voltage picked up by electrodes placed at various points in contact with the earth. The basis for surface methods of electrical prospecting is the fact that the potential induced at points along the surface of the earth by a current flowing through a section of the earth is dependent upon the electrical properties of the subsurface. The dependence of the potential at the surface of the earth on the electrical properties of any particular subsurface geological feature varies with the current density through the feature and with the distance from the feature to the surface. For example, with two potential electrodes at the surface of the earth spaced relatively close together as compared to the dimensions of a subsurface mineral deposit at some distance from the surface of the earth, the potential deviation from the normal potential, i. e., the potential induced between the electrodes in the absence of the deposit, depends upon the change of current density due to the presence of the deposit and the distance from the electrodes to the deposit. The normal potential is an integrated value or the summation of all the individual electrical effects in the subsurface within the range of influence of the electrodes. With increasing depth and consequently decreasing current density, the effects of deviations from normal in the current density become increasingly difficult to distinguish from the effects of the normal current density. These facts are well known to those familiar with the art of electrical exploration.

In order to obtain measurable effects due to subsurface changes in "apparent resistivity" of the earth formation, various schemes for placing and systematically changing the position of current and potential electrodes have been proposed. Since the penetration of the stream lines along which the input currents flow increases with increased spacing of the current electrodes, large spacings are used to obtain depth of current penetration. In obtaining depth of penetration by wide spacing of the current electrodes the actual current density decreases due to the distribution of the input current over large volumes of earth, necessitating increased spacing of the potential electrodes to detect the potential effects of current density changes. Many of the methods of prospecting suffer from a fundamental defect: the current density is higher near the potential electrodes on the surface than it is in the subsurface strata which are to be investigated. This condition is undesirable because it reduces the contrast between the normal and disturbed condition and thus makes the interpretation of data very difficult. The normal potentials, as previously defined, receive their largest contribution from the surface currents which are both nearby and of relatively large value.

Some methods of prospecting have been devised in which the current density in the surface near the potential electrodes is reduced to zero or to a very low value. These methods reduce surface effects by balancing them out for a given position of the electrodes. These methods reduce surface effects by providing an arrangement of electrodes in which current is supplied simultaneously to a plurality of electrodes to balance out or eliminate the surface effects under given conditions. Some of the effects of electrode spacing and current density have been mentioned. As is well known in the art, the spacing and current density required in a given system to obtain optimum results in a given area depends upon the geology of the area. For example, in prospecting in an area in which the earth overlying the deposit is substantially homogeneous, the optimum electrode spacing in any given system of the prior art differs from the optimum electrode spacing in the same system when prospecting an area in which the earth is stratified. Even in areas where the geology is rather well known, difficulty is experienced in determining optimum conditions for the first electrical exploration. The situation is further complicated by the fact that the depth and location of the prospective deposit are unknown. In making the electrical surveys the nature of the earth is unknown until after a set of measurements have been made. The proper current distribution can be determined only on the basis of analysis of field data. Often the area must be resurveyed under different operating conditions to obtain the desired current distribution and desired depth of current penetration. In other words, in the systems used at present the optimum operating conditions for carrying out an electrical survey, may be determined only by trial and error in the field measurements. In accordance with the present invention, a set of field data is obtained with the system and in the manner hereinafter described in detail, which data, once obtained, reduce the problem to mathematical analysis of the data rather than to trial and error in the field operations.

In the conventional methods of electrical surveying, the electrodes spacing, current intensity, frequency and/or other variables must be accurately adjusted relatively to a subsurface deposit if a maximum or minimum current density, relative to the surrounding earth, is to pass through the deposit. Owing to the fact that nearby disturbances in the surface of the earth create large electrical effects, it is necessary in obtaining data or in computing results that the electrical effects due to the surface disturbances be eliminated. Naturally, it is impossible to control the distance from the surface of the earth to the anomaly or portion of the subsurface containing the deposit. The field of operations is, therefore, moved to points as near the disturbance as the surface will allow and under present methods of surveying nothing further can be done to obtain larger effects. This invention provides means of obtaining data and of utilizing the data by which means the effect of the remaining variable, namely current density, may be computed. The methods of electrical surface prospecting devised heretofore do not furnish data which enable computation of the effect of the current density in the surface of the earth or through any given section of the subsurface. It is obvious that the determination of the effects of current density over a considerable region is a great improvement in the art. The following detailed description of the present method by which this improvement is realized and of its operation will make clear some of the advantages of the present invention.

An object of this invention is to provide an improved method of electrical investigation of the subsurface earth.

A further object of this invention is to provide such a method whereby the surface effects in any given section may be eliminated under given conditions.

A still further object of this invention is to provide such a method whereby the depth of maximum current density in the subsurface may be established and the effects of anomalies in the region of the maximum current density may be determined.

In the present invention, a wide spacing of both the input (current) electrodes and the pickup (potential) electrodes is employed. The distance between the pair of current electrodes and between the pair of potential electrodes is theoretically infinite, but in actual practice varies from about one thousand to five thousand feet or greater depending upon the depth to which investigations are desired and this distance is limited only by mechanical and economic considerations. The wide spacing between the corresponding pairs of electrodes permits greater depth of penetration of the exploring current under given frequency conditions than is obtainable with systems in which the electrode spacing must be limited by generator capacity or other considerations. The arrangement of the current and potential electrodes in the method of the present invention is such that the advantages of wide input and pickup electrode spacings may be utilized without the disadvantages of very large current generating capacity normally required by other methods. The apparatus of the present invention requires only one source of electric current.

Figure 1 of the drawings is a diagrammatic plan view of a portion of the surface of the earth under investigation showing the arrangement of electrodes and the apparatus.

Figure 1:
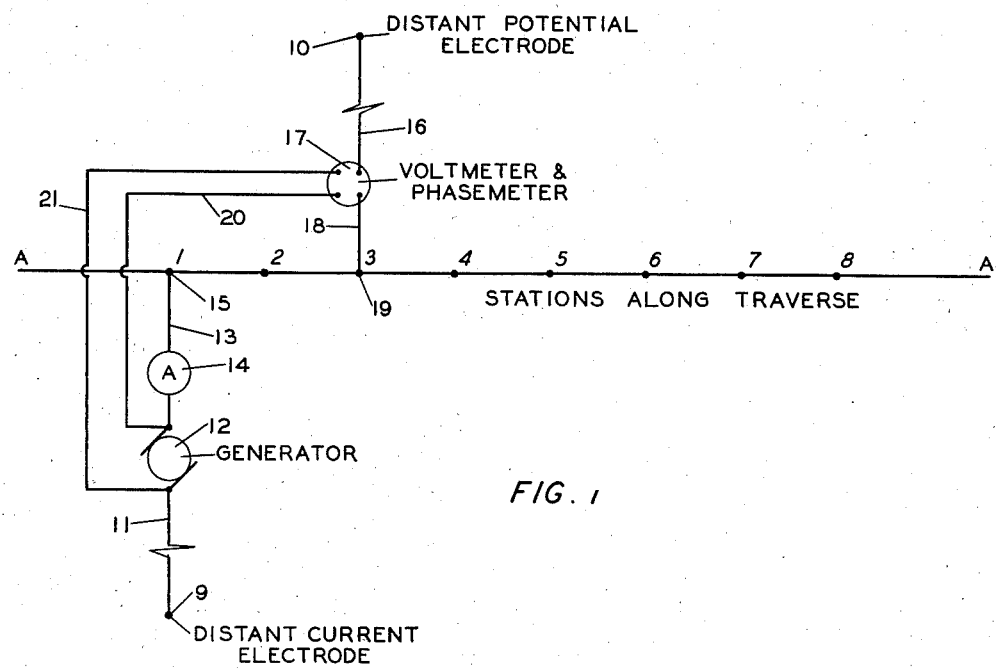

With reference to Figure 1 of the drawings, the line A—A represents a traverse on the surface of the earth along which electrical measurements are to be taken. The numerals 1 to 8 inclusive designate stations along the traverse at which electrodes are placed for taking of measurements. Preferably the stations are approximately equally spaced along the traverse, but the equal spacing is not essential to the success of the present invention. A current electrode 9 is placed at a great distance, for example, 20 times the interval between stations or farther, from the stations at which measurements are to be made at any particular time. Similarly, a potential electrode 10 is placed at a great distance from the stations at which measurements are being made and, at the same time a great distance from the current electrode 9. The current electrode 9 is connected by the insulated electrical conductor 11 to a source of alternating current, the generator 12. The generator 12 is connected by the insulated electrical conductor 13 to the other current electrode 15 which may be at any station positioned along the traverse A—A. The ammeter 14 indicates the quantity of current supplied to the current electrodes 9 and 15. The distant potential electrode 10 is connected by an electrical conductor 16 to the voltmeter and phasemeter 17. The instrument 17 is connected by the conductor 18 to the second potential electrode 19 which may be positioned at any station along the traverse A—A. The electrical conductors 20 and 21 connect from opposite terminals of the generator 12 to the instrument 17 to allow phase comparison between the electrical current input to the current electrodes and the potential pickup by the potential electrodes.

In operation, the current electrode 15 is first placed at station 1 on the traverse A—A and a constant amount of current supplied to the current electrodes 9 and 15 from the generator 12. The quantity of current supplied to the current electrodes may be determined by the ammeter 14. To obtain depth of penetration of the current from the current electrodes into the subsurface, the generator 12 is preferably a low frequency alternating current generator having a frequency in the range of .1 to 10 cycles per second. Alternating currents of these low frequencies have substantially the same penetrative power as direct currents and are not subject to polarization or transient current effects. The potential electrode 19 is then placed at station 2 along the traverse and the potential between the potential electrodes 10 and 19 determined by the voltmeter of instrument 17. The phase relationship between the input current from the generator 12 and the pickup potential indicated by the voltmeter is determined by the phasemeter of instrument 17. The potential electrode is then moved successively to stations 3, 4 etc. along the traverse to as many stations as desired. The pick-up potential and the phase relationship of the pickup potential to the input current is determined for each position of the electrode 19. The current electrode 15 is moved to station 2 and the current input adjusted to correspond to that formerly used at station 1. Potential and phase measurements are then made with the potential electrode at stations 3, 4, 5, etc. This procedure is repeated until the current electrode 15 has occupied each station along the traverse or until the desired distance has been traversed. Preferably, the potential electrode 19 is positioned at three or more stations for each position of the current electrode 15. The distant electrodes 9 and 10 need be moved only when convenient or necessary because of mechanical limitations. The distant electrodes may be placed along the line of traverse at the required distance from electrodes 15 and 19.

The same results may be obtained by placing the potential electrode 19 at successive stations, supplying a constant current to a plurality of adjacent stations in succession for each position of the potential electrode, and measuring the induced potentials and phase relations for each position of the current electrodes. Otherwise stated, the results obtained by supplying current to an electrode at station 1 and determining the potential at station 3 are the same as those obtained if the same quantity of current is supplied to an electrode at station 3 and the potential determined at station 1. If any number of electrodes, of such size as to be essentially point electrodes in comparison with the distances involved, are placed in the earth's surface with currents of arbitrary frequency and magnitude flowing into or out of the electrodes, the potential at every instance of time for any point on the surface is the algebraic sum of the potentials due to each electrode when it alone carries current. In the network theory this principle is known as "the principle of super-position." The theorem is the consequence of the fact that the potential field due to one electrode is proportional to the current supplied to that electrode. Another important theorem upon which this invention is based is the reciprocity theorem, that is, if the potential at one point in an electrical network, due to the current at another point, is determined and the points are then interchanged using the same current, the same potential will be indicated. Thus it is apparent that the potential electrode 19 and current electrode 15 may be interchanged at the convenience of the operator without affecting the results obtainable. It is further apparent that either the potential electrode or the current electrode may be moved relatively to the other along the stations of the traverse, and that the measurements may be made in any order without affecting the results obtained.

From the two theorems, the mathematical relation between the input current and the observed voltages may be established.

Let:

$I_j$ = the observed current at any given electrode $j$.
$V_{kj}$ = the potential or voltage observed at electrode $k$ relative to a point spaced at great distance from electrode $k$ due to the current at $j$.
$P_{jk}$ = the ratio of $V_{kj}$ to $I_j$ or the coefficient of mutual impedance where current is applied only to electrode $j$ and an electrode at great distance.

The potential at electrode $k$ is the summation of all the electrical effects everywhere, including that introduced at the stations along the traverse. If the constant effect of the natural earth currents is omitted, the potential at the electrode $k$ due to current flowing simultaneously into all of the other electrodes along the traverse is the summation of the products of the observed current at every electrode other than $k$ and the corresponding coefficients of mutual impedance. This may be expressed mathematically for each station along the traverse where $n$ designates the $n$th station.

$$V_1 = -P_{2,1}I_2 + P_{3,1}I_3 + P_{4,1}I_4 + (\text{etc.}) \ldots P_{n,1}I_n$$
$$V_2 = P_{1,2}I_1 - + P_{3,2}I_3 + P_{4,2}I_4 + (\text{etc.}) \ldots P_{n,2}I_n$$
$$V_3 = P_{1,3}I_1 + P_{2,3}I_2 + - + P_{4,3}I_4 + (\text{etc.}) \ldots P_{n,3}I_n$$

etc., or generalizing:

$$V_K = P_{1,K}I_1 + P_{2,K}I_2 + P_{3,K}I_3 + P_{4,K}I_4 + (\text{etc.}) - + P_{n,K}I_n \quad (1)$$

The above equations illustrate the application of the general formula for the computation of the potential at any station due to the simultaneously applied currents at $n$ other stations. The potential difference $V_n - V_m$ between any two points, for example points $m$ and $n$ is obtained by subtraction of the $m$th equation from the $n$th equation. The experimental procedure outlined above can be used to evaluate any chosen set of P's. In practice only a certain small number of P's are of interest. It should be noted that the reciprocity theorem makes $P_{kj} = P_{jk}$. When alternating currents are used, at frequencies high enough for the earth impedance to have an appreciable inductive or capacitative component, the P's are complex numbers since the voltage and current are not necessarily in phase. Furthermore, the P's are different for each frequency, since the current penetration varies with the frequency.

The relations of Equation 1 are demonstrated in most texts on electrodynamics; in the case of the similar equations in conducting media the demonstration is frequently omitted. (See W. R. Smythe, Static and Dynamic Electricity, page 233, McGraw Hill, 1939, for a discussion of currents in a conducting media, and the derivation of these equations from the principles of electricity.)

Figure 2:
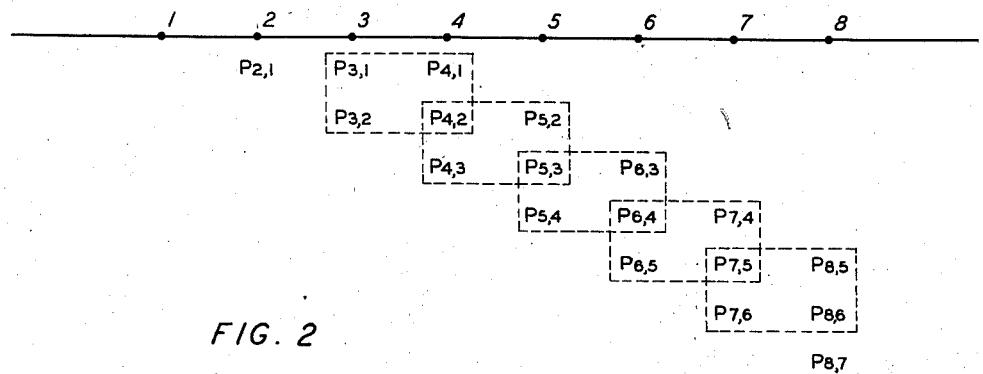
Figures 2 and 3 are diagrammatic representations of data obtained and groupings of the data for computation of results.
Figure 3:
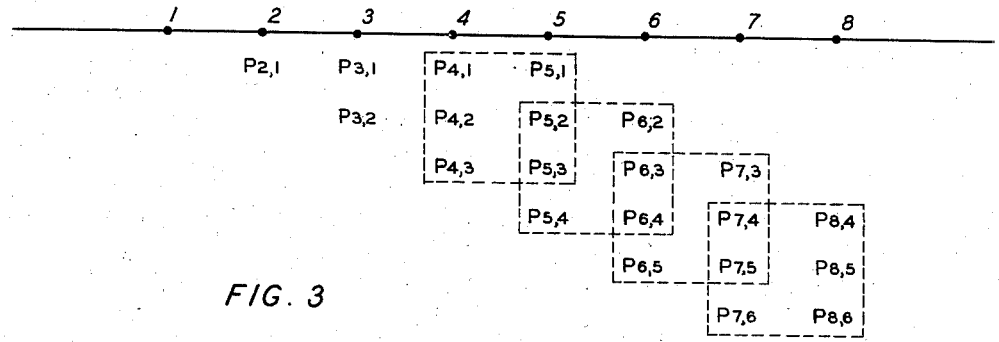

The method of obtaining field data by the method of my invention is based on a desire to obtain the values of the P's in the Equation 1 for electrode groupings as shown in Figures 2 and 3. By placing the current return electrode and distant zero potential electrode at a great distance from the line of measurement and at a great distance from each other they have little influence on the evaluation of the P's one at a time. For instance $P_{2,1}$ is evaluated by assigning a value of zero to all the currents in the first equation except the current $I_2$ and finding the potential on electrode 1. Then $P_{1,2}$ is the ratio of this potential to the current and has the properties of a mutual impedance. In the same way $P_{3,1}$ may be evaluated so that the equation relating the potential on electrode 1 in terms of $I_2$ and $I_3$ may be written as follows:

$$V_1 = P_{2,1}I_2 + P_{3,1}I_3$$

and this relation holds for all values of the currents. The P's depend only on the geometry of the electrodes and the conducting medium and are independent of the magnitude of the currents. Proceeding in the same manner the value of the P's may be determined in the following equation:

$$V_4 = P_{2,4}I_2 + P_{3,4}I_3$$

Suppose for example that it is desirable to determine the voltage that would appear between stakes of electrodes 1 and 4 if a current generator were connected between electrodes 2 and 3. By the methods employed heretofore, such a determination would require actually setting up the apparatus to supply current to electrodes 2 and 3 and to measure the voltage appearing between electrodes 1 and 4. By operating in accordance with the present invention, the data obtained in the manner indicated allows calculation of this value. In this case $I_2 = -I_3$ and the voltage difference is given by $V_1 - V_4$. Carrying out this operation with the above equations:

$$V_1 - V_4 = (P_{2,1} - P_{2,4} - P_{3,1} + P_{3,4})I_2$$

The potential difference obtained is just what would have been obtained in the field if a four electrode survey had been made. The method of making a survey with four equally spaced electrodes with the current applied to the inner two and the potential applied to the outer two is a very well known method. Because of the fact that the subscripts on the P's can be interchanged it can be shown that the current and potential electrodes can be interchanged. The mere obtaining of the results of a four electrode survey would not justify the more elaborate field procedure required to evaluate the P's unless further use could be made of them such as can be obtained by manipulating Equation 1.

The lines of current flow from several electrodes add according to the rules for the addition of vector quantities. At each point in the ground the resultant current density vector is the sum of the current density vectors for each electrode taken separately. Now since the current sources are at different points on the surface, the lines of current flow will in general assume different directions. At frequencies sufficiently high for the inductive reaction to be important the phase of the current density vector as well as the direction and magnitude thereof will be different from each electrode. (The present consideration involves only the case where the applied frequency is low enough to eliminate inductive reaction.) There will be, however, certain places where the currents flowing between several electrodes are parallel or nearly parallel. In the case of four electrodes in a line the current flowing between the inner pair will be parallel to the current flowing between the outer pair along a line joining the four electrodes, neglecting the four points or regions adjacent to the electrodes themselves. Now by making the direction of current flow between one pair of electrodes opposite to the direction of flow of the other pair at any point under consideration on the above line their ratio may be adjusted so that the current density at this point is zero. If the point is chosen at which the current density is to be zero at a distance from the electrodes, the current density will be small for a considerable distance on either side of the exact balance point. The balance point can be taken anywhere along the line of electrodes either inside or outside the interval occupied by the electrodes. Now the potential distribution on the surface of the ground at points other than the balance point will not be affected by changes in conductivity close to the balance point. The soil might, for instance, be removed for a small distance around the point where the current density is substantially zero without influencing the surface potentials at more distant points. There would be, then, a potential distribution which is not influenced by conditions in the neighborhood of the chosen point. Now suppose that it is known what the potential should be, in the absence of a disturbing body lying on the line joining the electrodes, at several other points along this line. If the balance point is chosen near the disturbing body the expected potential will be obtained; at other points the body will cause the potential to differ from its expected value. This gives a key to a method of either finding the disturbing body or eliminating its effects from measurements on other disturbances. By using more than two independent lines of current flow as given by four electrodes in this illustrative case, the current may be balanced to zero in more than one point. It is also apparent that there are points along the surface where the current from several electrodes may be parallel at points below the surface. The use of Equation 1 and the P's evaluated by the field procedure of this invention to take advantage of the above mentioned properties of the current can be better understood by assuming a typical situation.

Let us assume that the data given by the field measurements have been taken and reduced to the equivalent of a four electrode survey in the manner outlined above. Let us further assume that at some particular group of electrodes say 3, 4, 5, and 6 of Figure 2 the apparent resistivity of the ground has an anomalous value compared to more distant measurements and it is suspected that the cause of the anomaly is some purely surface change in resistivity of the ground. To test this hypothesis we would compute the currents which, if introduced between electrodes 2 and 7 and 3 and 6, would give zero voltage between electrodes 4 and 5. The field procedure has evaluated the proper P's to do this, since we can write:

$$V_4 = P_{2,4}I_2 + P_{3,4}I_3 + P_{6,4}I_6 + P_{7,4}I_7$$
$$V_5 = P_{2,5}I_2 + P_{3,5}I_3 + P_{6,5}I_6 + P_{7,5}I_7$$

Now make $I_2 = -I_7$ and $I_3 = -I_6$ to represent the case of two simultaneous currents flowing along the line from electrode 4 to 5. Now by subtracting one equation from the other we obtain the potential difference between electrodes 4 and 5 in terms of $I_2$ and $I_3$:

$$V_4 - V_5 = (P_{2,4} - P_{7,4})I_2 + (P_{3,4} - P_{6,4})I_3 + (P_{7,5} - P_{2,5})I_2 + (P_{6,5} - P_{3,5})I_3$$

If $V_4 - V_5$ is to be zero the current ratio must be:

$$\frac{-I_2}{I_3} = \frac{P_{3,4} - P_{6,4} + P_{6,5} - P_{3,5}}{P_{2,4} - P_{7,4} + P_{7,5} - P_{2,5}}$$

The negative sign indicates that the directions of flow in the center of the electrode spread must be in opposite directions as might be expected. The right hand side of the equation is known, and similar expressions can be obtained for a number of similar electrode stations at more distant points. Now if the computed ratio of currents is the same at our anomalous stations as at other stations along the line of measurement there will be a confirmation of our hypothesis that the disturbance lies in the surface between electrodes 4 and 5 since the conditions for zero potential difference between electrodes 4 and 5 also require the average current density between these points to be low and consequently a disturbing body between these two electrodes would have little influence on the above current ratio.

When the general character of the subsurface resistivity is known it is possible to obtain by computation, the values of current ratios to make the current zero below the surface. In a manner similar to the above we can then test other assumed locations for a disturbing body, or changes in the subsurface. When the lines of current flow are not parallel we can only reduce (by calculations) the current to as near a zero value as possible.

It will be apparent, therefore, that once the survey is made and the data obtained in accordance with the method of my invention, one skilled in the art may, by making calculations as illustrated, obtain data comparable to that obtainable by any configuration of electrodes. This is a great advantage over the prior methods of surveying, since one cannot know beforehand, which of the electrode configurations (there are many disclosed in the prior art) will give the best results for a given area or tract of land to be surveyed. The present invention eliminates the necessity of making a series of surveys of the same area, using a different electrode arrangement for each survey, in order to obtain the most satisfactory results.

Another important application of the above relations will be considered. For example, assume that the data has been taken as indicated in Figure 2 and that it is desired to consider the effect resulting from maintaining zero average potential drop between any two adjacent stations in the sequence along the traverse with the simultaneous application of current at the two numerically preceding electrodes. As a specific illustration, consider the stations 1 and 2 as current electrodes and the stations 3 and 4 as the electrodes between which it is desired to establish a zero potential drop. Then in Equation 1 above all the applied currents except those with the subscripts 1 and 2 become zero. Subtracting the equation for $V_4$ from the equation for $V_3$, the following relation is obtained:

$$V_3 - V_4 = P_{3,1}I_1 - P_{4,1}I_1 + P_{3,2}I_2 - P_{4,2}I_2$$

But, since $V_3 - V_4$ is arbitrarily chosen equal to zero, the above equation may be resolved into the following relationship:

$$\frac{P_{3,1} - P_{4,1}}{P_{4,2} - P_{3,2}} = -\frac{I_2}{I_1} \qquad (2)$$

A similar relationship may be expressed to represent the condition with zero average potential drop between the stations 3 and 4 with the simultaneous application of current to the two numerically succeeding stations 5 and 6 along the traverse.

$$\frac{P_{5,3} - P_{5,4}}{P_{6,3} - P_{6,4}} = -\frac{I_6}{I_5} \qquad (3)$$

The usefulness of the relationships set forth in Equations 2 and 3 will be more evident from a consideration of the following observations. If the line connecting the stations 3 and 4 be designated the $x$-axis, the following mathematical relationship may be employed, $$V_3 - V_4 = \int_3^4 j_x \rho \, dx \qquad (4)$$

where:
$j_x$ = current density along the $x$-axis,
$\rho$ = resistivity along the $x$-axis, and
$x$ = distance along the $x$-axis.

In general $j_x$ and $\rho$ are functions of the distance $x$. In the event that $\rho$ is constant, then from Equation 4 it is evident that, for $V_3 - V_4 = 0$, the average current along the $x$-axis in the direction 3 to 4 is zero. It follows that if this current is small then any departure from a constant value for the resistivity, $\rho$, due to a disturbing body for instance, can only create a small deviation from the case where $\rho$ is a constant. Therefore, if the experimental number given by the Equation 2 is compared with the theoretical value for some assumed variation of the earth's resistivity throughout a suitable volume beneath the stations employed in the investigation, then any deviations between the true value and the theoretical value will be only slightly dependent on surface inhomogeneities between the chosen two adjacent stations between which the potential drop is taken as zero. The theoretical value used for comparison is based upon existing knowledge of the physical characteristics of the section of the earth being investigated and, if necessary, upon assumptions. To illustrate, as an example, the calculation of the theoretical value for $I_2/I_1$ for the case of a homogeneous earth may be made from the well known laws of current flow. From these laws it follows that, $$\frac{V_{1,3}}{I_1} = \frac{\rho}{2\pi x_{1,3}} = P_{1,3} \qquad (5)$$

where
$\pi$ = the mathematical ratio 3.14159+,
$\rho$ = the resistivity constant throughout the homogeneous ground, and
$x_{1,3}$ = the distance from the potential electrode at 3 to the current electrode at 1. (See Smythe referred to above, page 237).

The quantities $P_{1,4}$, $P_{2,4}$, and $P_{2,3}$ are similarly obtained. Substituting these values in Equation 2, yields the following relationship.

$$\frac{I_2}{I_1} = -\frac{1/x_{1,3} - 1/x_{1,4}}{1/x_{2,3} - 1/x_{2,4}} \qquad (6)$$

It is to be noted that this relation is a negative number, showing that the currents $I_1$ and $I_2$ have an opposite sense. The theoretical value for the ratio $I_2/I_1$ from Equation 6 is compared with that obtained by substituting experimental values in Equation 2 to detect anomalies below the surface. These ratios are numerical quantities which are more sensitive to variations in resistivity below the surface than to variations at or near the surface. Since, in general, the search for disturbances below the surface of the earth is unavoidably carried out under circumstances in which undesirable surface effects due merely to the terrain or topography are present, it is very useful to eliminate these irrelevant effects. In the event that the surface consists of two thin layers of different resistivities, this fact should be taken into account in Equation 5 before computing the theoretical ratio $I_2/I_1$ from Equation 6 in accordance with methods of computing such cases as is known to those skilled in the art.

Returning to the example in which the voltage drop between the stations 3 and 4 is zero in the case of a homogeneous earth, this means that the average current in the surface earth along the $x$-axis, or line connecting the stations, must equal zero. In the light of the foregoing mathematical analysis, it becomes obvious that an inhomogeneity in the surface between the stations 3 and 4 can at most produce only a slight deviation from the results obtained if the surface were homogeneous. This follows from the fact that a disturbing body manifests itself only by changing the normal flow of current and if the current is zero between the stations, as evidenced by zero potential drop, there is nothing to change.

If an inhomogeneity occurs in the surface between current electrodes while the subsurface remains fairly uniform, the disturbance can be located by comparison of the results obtained at subsequent current stations along the traverse. For example, suppose, in the case of homogeneous ground there is no potential drop between stations 4 and 5, and that an inhomogeneity occurs between stations 1 and 2. By comparison of Equations 2 and 3 with the corresponding theoretical values from Equation 6 and observing which of the equations shows the greatest deviation from the theoretical, the observer may infer the location of the inhomogeneity and check the observation by similar calculations for other sets of stations along the traverse. Generalizing, the difference between the quantities observed by comparison of Equations 2 and 3 with the theoretical value may be attributed to asymmetry in the terrain or subsurface. Whether the inhomogeneity causing this asymmetry be ascribed to the surface or the subsurface depends upon knowledge of the terrain and comparison with other computations from the complete set of data taken along the line of profile. From the foregoing examples of the utility of the data obtainable by the methods of this invention, many advantages of the invention over present practices will be apparent to those skilled in the art.

The data taken in the field depends, to some extent at least, upon the use to which the data is put. In surveying by the present method, the potential may be measured at any number of stations for each position of the current input electrode along the traverse. Figure 3 illustrates the data obtained by using four potential electrode positions for each current electrode position. Such a set of data allows the computor to arbitrarily set a condition of maximum or minimum current density at a given region in the subsurface while maintaining zero current, i. e. zero potential drop, between the two surface stations. For example, if it is assumed that currents are applied simultaneously at three current stakes, as at stations 1, 2, and 3, the relations of Equation 1 may be combined in such a way that the potential drop between stakes 4 and 5 is zero and, at the same time, the potential drop between two points vertically below 4 and 5 at an arbitrarily chosen distance in the earth is zero also. From the relations of Equation 1:

$$V_4 - V_5 = P_{4,1}I_1 + P_{4,2}I_2 + P_{4,3}I_3 - P_{5,1}I_1 - P_{5,2}I_2 - P_{5,3}I_3$$

or since $V_4 - V_5 = 0$, arbitrarily, then $$0 = (P_{4,1} - P_{5,1})I_1 + (P_{4,2} - P_{5,2})I_2 + (P_{4,3} - P_{5,3})I_3 \quad (7)$$

Figure 4:
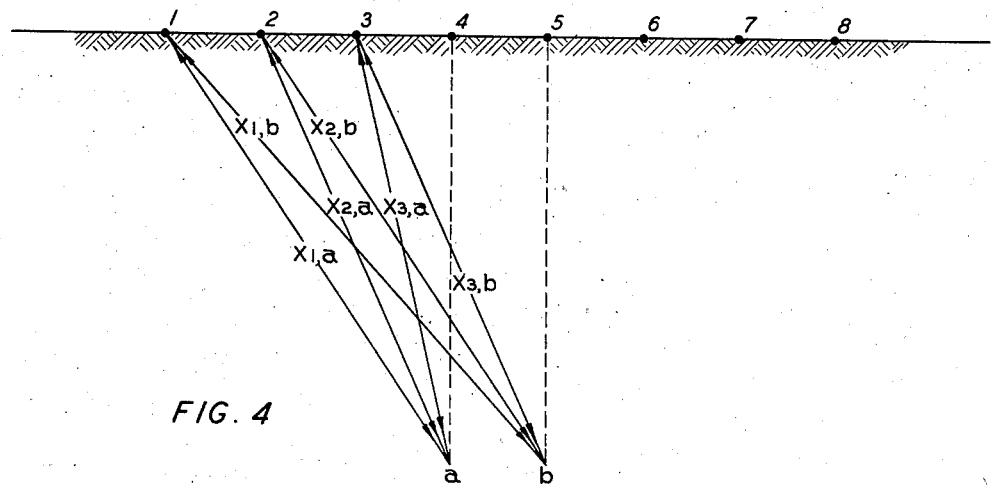
Figure 4 is a diagrammatic representation of a cross section through the earth's surface along a line of profile to illustrate an application of the present invention.

From Equation 7 it is evident that there are two current ratios, $I_2/I_1$ and $I_3/I_1$ that can be adjusted. The current ratios required to make the potential drop between two points at an arbitrary depth below 4 and 5 zero, while maintaining zero potential drop between stations 4 and 5 at the surface of the earth may be evaluated theoretically in much the same manner as the evaluation of Equation 6. To illustrate the case in which the earth is homogeneous, assume with reference to Figure 4 that it is desired to compute the effect when the potential drop between the points $a$ and $b$ in the subsurface is equal to zero while the potential drop between the stations 4 and 5 is also equal to zero. Then the following theoretical relationships must be satisfied, $$V_4 - V_5 = \frac{\rho}{2\pi x_{1,4}}I_1 + \frac{\rho}{2\pi x_{2,4}}I_2 + \frac{\rho}{2\pi x_{3,4}}I_3 -$$
$$\frac{\rho}{2\pi x_{1,5}}I_1 - \frac{\rho}{2\pi x_{2,5}}I_2 - \frac{\rho}{2\pi x_{3,5}}I_3 \quad (8)$$

and $$V_a - V_b = \frac{\rho}{2\pi x_{1,a}}I_1 + \frac{\rho}{2\pi x_{2,a}}I_2 + \frac{\rho}{2\pi x_{3,a}}I_3 -$$
$$\frac{\rho}{2\pi x_{1,b}}I_1 - \frac{\rho}{2\pi x_{2,b}}I_2 - \frac{\rho}{2\pi x_{3,b}}I_3 \quad (9)$$

where the nomenclature is the same as for Equation 5 except that $x$ denotes the distance relative to Figure 4 between the points indicated by the subscripts used with $x$. From the relationships expressed in Equations 8 and 9, the ratios $I_2/I_1$ and $I_3/I_1$ can be computed, since $V_4 - V_5 = 0$ and $V_a - V_b = 0$. By comparing the theoretical values for the current ratios, for homogeneous earth, with the experimental values for the ratios obtained from the relationship of Equation 7 the deviation of the actual earth from the theoretical homogeneous earth are apparent. The theoretical relations for the current ratios in a more complicated situation than for the homogeneous earth where the resistivity is constant, may be assumed to establish the basic theoretical relation for comparison with that obtained from the actual measured values. The advantage of being able to establish the relationships for the case illustrated in Figure 4 will be at once apparent to one skilled in the art. When an anomaly is observed, the points 3 and 6 may be arbitrarily chosen until the deviation of the ratios based on data from those based on theory are a minimum. When this condition is obtained, the inhomogeneity or disturbance must be in the vicinity of points $a$ and $b$.

Obviously, the data may be combined in other ways and extended to cases where it is desired to compute the effects which might prevail if the current were simultaneously applied to $n$ electrodes and the voltage picked up across any two other electrodes. Then $n-1$ conditions relative to potential drops between points beneath the potential stations can be arbitrarily set. The experimental procedure in evaluating the P's and the use of the data, as outlined in the foregoing examples, depends upon the complexity of the region being explored. As many derived relations may be used in making the calculations as are required to yield the information desired. The establishment of points of minimum potential drop beneath the surface of the earth, as illustrated above in connection with Figure 4, obviously requires that there be points of maximum potential drop, or maximum current density, at some depth beneath the surface since the potential drop for points at great depth must necessarily be zero. In some instances it may be desirable to control the position of the maximum potential drop, in a manner somewhat analogous to that of controlling the minimum potential drop, in order that the effect of high current densities may be investigated where discontinuities are suspected.

The effect of frequency upon penetration of the exploring current has already been discussed. It is often desirable in taking field data to take a set of data as outlined above using a set generator frequency, then to take a duplicate set of data at a different generator frequency. Either or both sets of data may then be used in the computations outlined above.

The foregoing theoretical considerations, while far from complete, illustrate the applications of the present invention to some of the fundamental cases. In actual practice, the earth is highly complex and the corresponding theory becomes much more involved. It is believed, however, that the foregoing illustrations will serve to enable one skilled in the art to appreciate the significant factors involved in the present invention and illustrate its application. The present invention eliminates apparatus limitations in electrical surface surveying permitting a high degree of flexibility by reason of the improved method of obtaining electrical data.

I claim:

1. The method of electrical prospecting comprising establishing a sequence of stations at spaced points along a traverse on the surface of the earth, supplying a constant low frequency alternating electric current to a fixed earthed current electrode at a distance from said stations at least 20 times the distance between adjacent stations and to each station in succession to cause flow of electric current therebetween, the distance between each of said stations and the earthed current electrode being substantially constant for each successive station; and successively measuring the potential at each of a series of stations adjacent each station to which current is supplied, relative to a fixed earthed potential electrode spaced from said stations at a distance at least 20 times the distance between adjacent stations, said earthed potential electrode being spaced at a great distance from said earthed current electrode.

2. In the method of claim 1, the constant low frequency alternating current being within the range of 0.1 to 10 cycles per second.

RAYMOND G. PIETY.